United States Patent [19]
Patterson

[11] Patent Number: 5,937,695
[45] Date of Patent: Aug. 17, 1999

[54] KNOCKOUT TOOL

[76] Inventor: Mark Patterson, 1430 Springfield Church Rd., Jackson Center, Pa. 16133

[21] Appl. No.: 09/057,774

[22] Filed: Apr. 9, 1998

[51] Int. Cl.⁶ .................... B21D 1/06; B21D 3/14
[52] U.S. Cl. ..................... 72/458; 72/479; 81/427.5
[58] Field of Search ............ 72/458, 479; 81/427.5

[56] References Cited

U.S. PATENT DOCUMENTS

| | | | |
|---|---|---|---|
| 442,155 | 12/1890 | Virtue | 81/427.5 |
| 444,035 | 1/1891 | Wyatt | 81/427.5 |
| 2,772,587 | 12/1956 | Woodering et al. | 72/458 |
| 4,034,595 | 7/1977 | Smith | 72/458 |
| 5,161,404 | 11/1992 | Hayes | 72/458 |

FOREIGN PATENT DOCUMENTS

| | | | |
|---|---|---|---|
| 1065918 | 5/1954 | France | 72/458 |
| 240505 | 7/1946 | Switzerland | 72/458 |

Primary Examiner—David Jones

[57] ABSTRACT

A new knockout tool for prying open knockout rings on electrical boxes to allow electrical circuit to be inserted therethrough. The inventive device includes an elongate handle having opposite proximal and distal ends and an working arm member coupled to the proximal end of the handle. The arm member has a terminal end with a notch which extends between the lateral sides of the arm member.

9 Claims, 2 Drawing Sheets

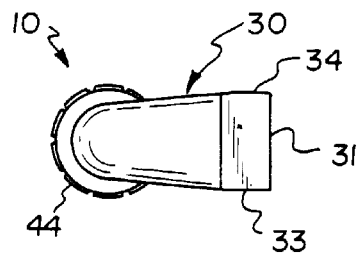
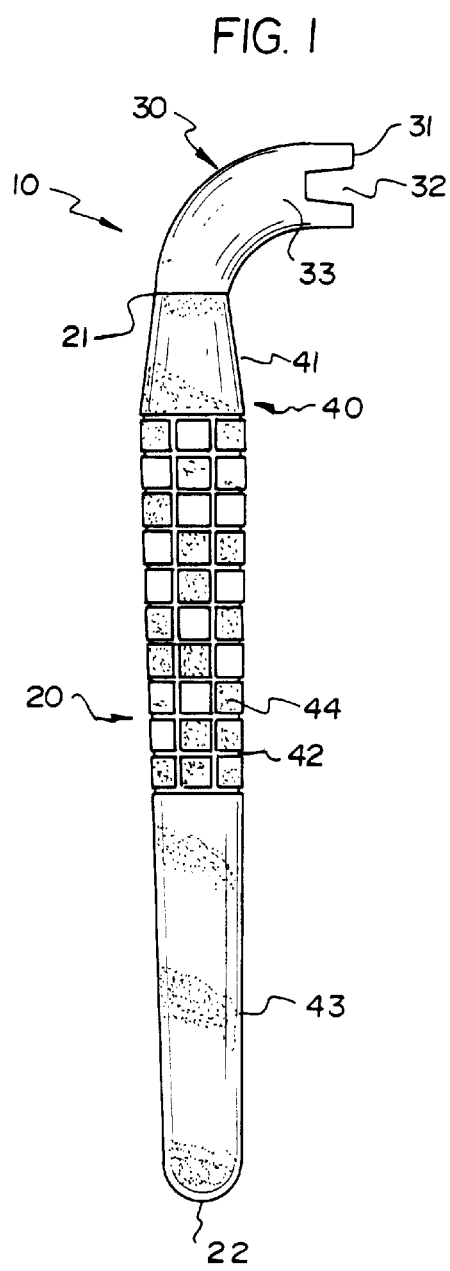
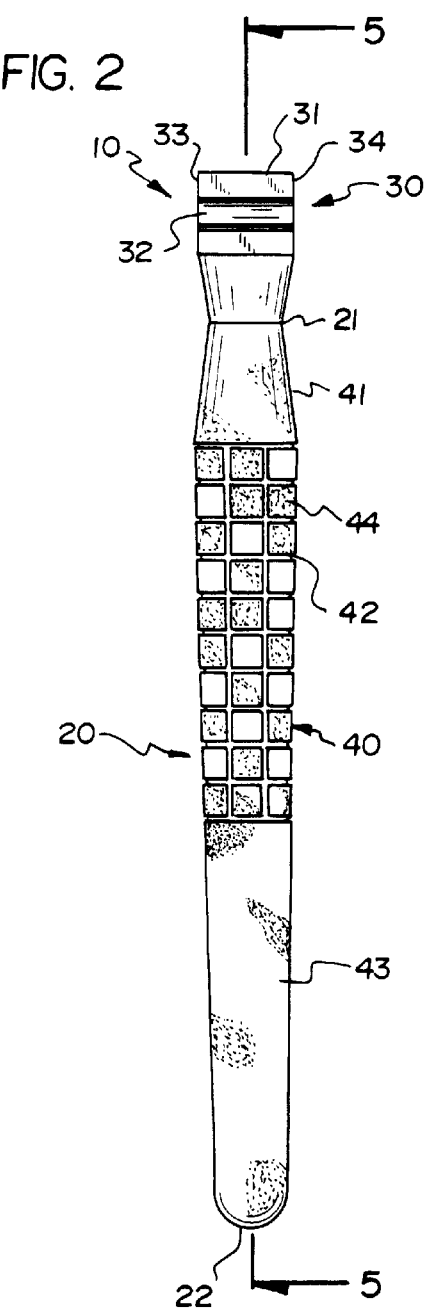

KNOCKOUT TOOL

BACKGROUND OF THE INVENTION

1. Field of the Invention

The present invention relates to tools for removing knockout rings from electrical boxes such as electrical meter boxes, breaker panels, and junction boxes and more particularly pertains to a new knockout tool for prying open knockout rings on electrical boxes to allow electrical circuit to be inserted therethrough.

2. Description of the Prior Art

The use of tools for removing knockout rings from electrical boxes, such as electrical meter boxes, breaker panels, and junction boxes is known in the prior art. More specifically, tools for removing knockout rings from electrical boxes, such as electrical meter boxes, breaker panels, and junction boxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art tools for removing knockout rings from electrical boxes, such as electrical meter boxes, breaker panels, and junction boxes include U.S. Pat. No. 4,299,021; U.S. Pat. No. 3,987,827; U.S. Pat. No. 4,039,140; U.S. Pat. No. 3,934,779; U.S. Pat. No. 4,815,707; and U.S. Pat. No. Des. 272,712.

While these devices fulfill their respective, particular objectives and requirements, the aforementioned patents do not disclose a new knockout tool. The inventive device includes an elongate handle having opposite proximal and distal ends and an working arm member coupled to the proximal end of the handle. The arm member has a terminal end with a notch which extends between the lateral sides of the arm member.

In these respects, the knockout tool according to the present invention substantially departs from the conventional concepts and designs of the prior art, and in so doing provides an apparatus primarily developed for the purpose of prying open knockout rings on electrical boxes to allow electrical circuit to be inserted therethrough.

SUMMARY OF THE INVENTION

In view of the foregoing disadvantages inherent in the known types of tools for removing knockout rings from electrical boxes, such as electrical meter boxes, breaker panels, and junction boxes now present in the prior art, the present invention provides a new knockout tool construction wherein the same can be utilized for prying open knockout rings on electrical boxes to allow electrical circuit to be inserted therethrough.

The general purpose of the present invention, which will be described subsequently in greater detail, is to provide a new knockout tool apparatus and method which has many of the advantages of the tools for removing knockout rings from electrical boxes, such as electrical meter boxes, breaker panels, and junction boxes mentioned heretofore and many novel features that result in a new knockout tool which is not anticipated, rendered obvious, suggested, or even implied by any of the prior art tools for removing knockout rings from electrical boxes, such as electrical meter boxes, breaker panels, and junction boxes, either alone or in any combination thereof.

To attain this, the present invention generally comprises an elongate handle having opposite proximal and distal ends and an working arm member coupled to the proximal end of the handle. The arm member has a terminal end with a notch which extends between the lateral sides of the arm member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new knockout tool apparatus and method which has many of the advantages of the tools for removing knockout rings from electrical boxes, such as electrical meter boxes, breaker panels, and junction boxes mentioned heretofore and many novel features that result in a new knockout tool which is not anticipated, rendered obvious, suggested, or even implied by any of the prior art tools for removing knockout rings from electrical boxesm, such as electrical meter boxes, breaker panels, and junction boxes, either alone or in any combination thereof.

It is another object of the present invention to provide a new knockout tool which may be easily and efficiently manufactured and marketed.

It is a further object of the present invention to provide a new knockout tool which is of a durable and reliable construction.

An even further object of the present invention is to provide a new knockout tool which is susceptible of a low cost of manufacture with regard to both materials and labor, and which accordingly is then susceptible of low prices of sale to the consuming public, thereby making such knockout tool economically available to the buying public.

Still yet another object of the present invention is to provide a new knockout tool which provides in the apparatuses and methods of the prior art some of the advantages thereof, while simultaneously overcoming some of the disadvantages normally associated therewith.

Still another object of the present invention is to provide a new knockout tool for prying open knockout rings on electrical boxes to allow electrical circuit to be inserted therethrough.

Yet another object of the present invention is to provide a new knockout tool which includes an elongate handle having opposite proximal and distal ends and an working arm member coupled to the proximal end of the handle. The arm member has a terminal end with a notch which extends between the lateral sides of the arm member.

Still yet another object of the present invention is to provide a new knockout tool that removes knockout rings quickly and cleanly from electrical boxes as to minimize rough and sharp edges around the hole formed through the electrical box.

Even still another object of the present invention is to provide a new knockout tool that helps avoid accidental removal of the wrong sized knockout ring on an electrical box.

These together with other objects of the invention along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new knockout tool according to the present invention.

FIG. 2 is a schematic front side view of the present invention.

FIG. 3 is a schematic top side view of the present invention.

DESCRIPTION OF THE PREFERRED EMBODIMENT

Figure 6:
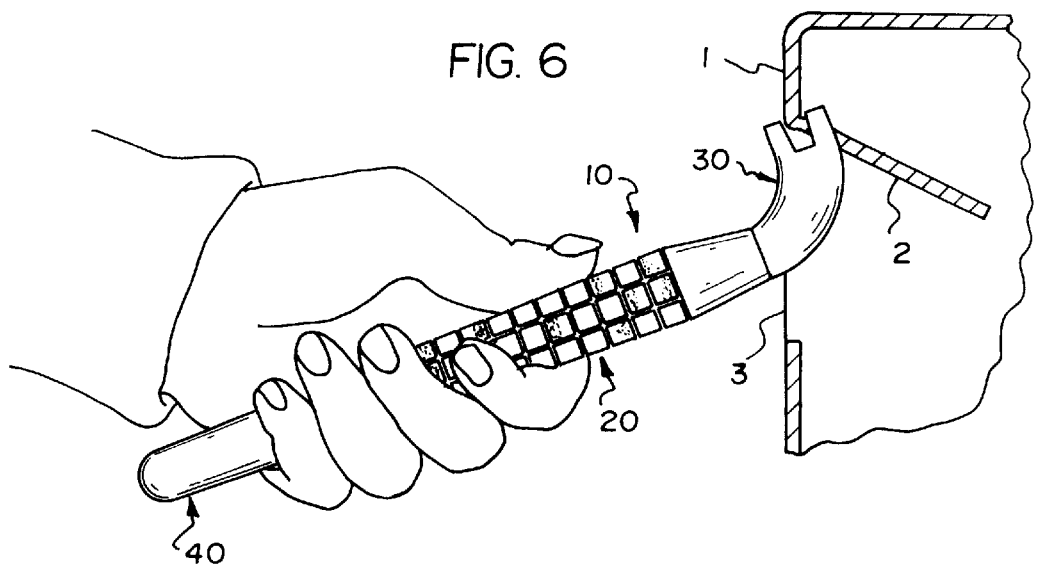
FIG. 6 is side view of the present invention in use removing a knockout ring from an electrical box.
Figure 5:
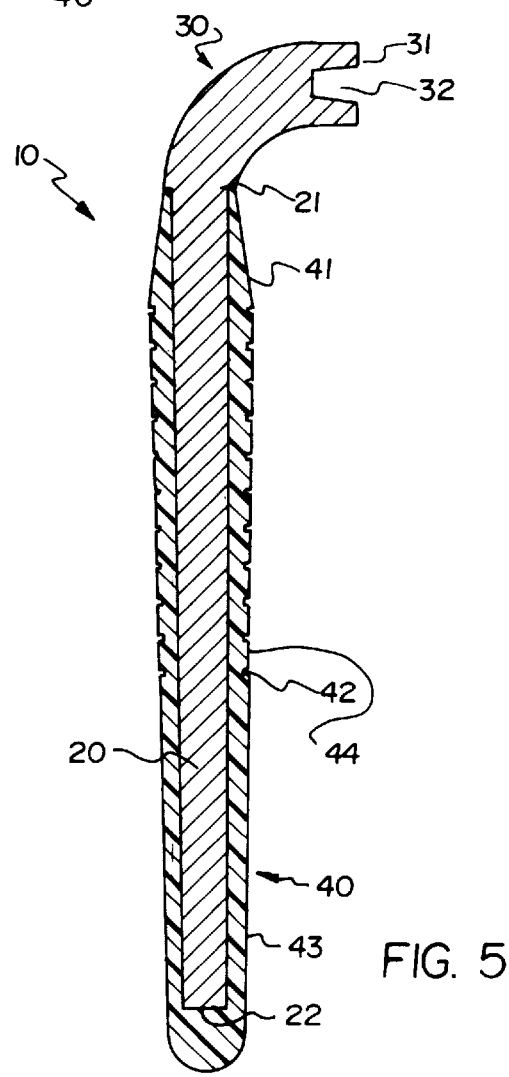
FIG. 5 is a schematic cross-sectional view of the present invention taken from line FIG. 2.
Figure 4:
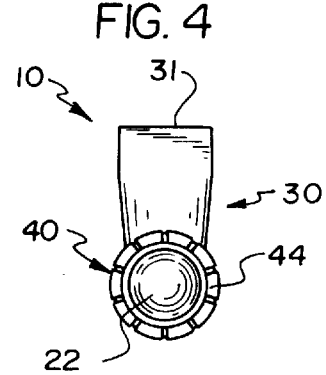
FIG. 4 is a schematic bottom side view of the present invention.

With reference now to the drawings and in particular to FIGS. 1 through 6 thereof, a new knockout tool embodying the principles and concepts of the present invention and generally designated by the reference numeral 10 will be described.

The knockout tool is designed for removing a knockout ring 2 from around an aperture 3 through the wall of an electrical box 1. As best illustrated in FIGS. 1 through 6, the knockout tool 10 generally comprises an elongate handle 20 having opposite proximal and distal ends 21,22 and an working arm member 30 coupled to the proximal end 21 of the handle 20. The arm member 30 has a terminal end 31 with a notch 32 which extends between the lateral sides 33,34 of the arm member 30.

In closer detail, the elongate handle 20 is generally cylindrical with a generally circular cross-section substantially perpendicular to the longitudinal axis of the handle 20 (which extends between the proximal and distal ends of the handle).

Preferably, provided on the outer surface of the handle 20 is the elongate cushioning gripping member 40. Ideally, the cushioning gripping member 40 comprises rubber. Like the handle 20, the cushioning gripping member 40 also preferably has a generally circular cross-section substantially perpendicular to the longitudinal axis of the handle 20. The cushioning gripping member 40 has proximal, central, and distal portions 41,42,43 with the central portion 42 interposed between the proximal and distal portions 41,43. In the preferred embodiment, the proximal portion 41 of the cushioning gripping member 40 is tapered towards the proximal end 21 of the handle 20 while the distal portion 43 of the cushioning gripping member 40 is tapered towards the distal end 22 of the handle 20. Ideally, the distal portion 43 of the cushioning gripping member 40 is rounded at the distal end 22 of the handle 20. Also ideally, the central portion 42 of the cushioning gripping member includes a plurality of gripping nibs 44 outwardly extending therefrom. The gripping nibs 44 are preferably generally rectangular and, ideally, arranged in a grid-like fashion on the central portion 42 of the cushioning gripping member 40.

The arcuate arm member 30 is coupled to the proximal end 21 of the handle 20. The terminal end 31 of the arm member 30 has a notch 32 therein for accepting a portion of a knockout ring 2 therein. With reference to FIG. 2, the notch 32 extends between the lateral sides 33,34 of the arm member 30. Preferably, the arm member 30 is formed, or curved, so that its terminal end 31 is extended substantially perpendicular from the longitudinal axis of the handle 20 for providing ideal leverage of the notch while using the tool to remove a knockout ring 2 from an electric box 1.

Illustratively, the handle and the arm member are made from a rigid durable material such as a metal, preferably hardened steel. While the tool may be constructed to any appropriate dimension, ideally the notch has a width of at least about ³⁄₁₆" while having a length between the lateral sides of about ⁵⁄₁₆". In this ideal illustrative embodiment, the tool 10 has a total length of about 6½" for ideal positioning of the tool 10 while in use removing a knockout ring 2.

In use, the tool 10 is ideally used to remove a knockout ring 2 that is commonly found around the wiring through-apertures 3 through the walls of an electrical box 1. Frequently, these electrical boxes 1 have several concentric knockout rings 2 around its apertures 3 so that a user may increase the size or diameter, of the aperture 3 to a variety of sizes as needed. The tool 10 allows a user to remove the appropriately sized knockout ring without accidentally removing any larger sized knockout ring around the aperture 3. As illustrated in FIG. 6 the tool 10 is used to remove a knockout ring 2 from an aperture 3 by inserting a portion of the knockout ring 2 into the notch 32 in the arm member 30. The handle 20 is moved back and forth (as shown in FIG. 6) so that the knockout ring 2 is loosened and removed from the wall of the electrical box 1.

As to a further discussion of the manner of usage and operation of the present invention. the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tool for removing a knockout ring from an electrical box, said tool comprising:

an elongate handle having an outer surface, opposite proximal and distal ends, and a longitudinal axis being extended between said proximal and distal ends of said handle; and an arm member being coupled to said proximal end of said handle, said arm member having a pair of lateral sides, and a terminal end, said terminal end having a notch therein, said notch being extended between said lateral sides of said arm member;

said notch being defined by an inside face which resides in a plane in parallel with the longitudinal axis and a substantially planar top and bottom face which diverge from the inside face, wherein a bisecting plane between the top and bottom face remains in perpendicular relationship with the longitudinal axis.

2. The tool of claim 1, wherein said handle has a generally circular cross-section substantially perpendicular to said longitudinal axis of said handle.

3. The tool of claim 1, further comprising an elongate cushioning gripping member being provided on said outer surface of said handle.

4. The tool of claim 3, wherein said cushioning gripping member has proximal, central, and distal portions, said central portion of said cushioning gripping member being interposed between said proximal and distal portions of said cushioning gripping member, said proximal portion of said cushioning gripping member being tapered towards said proximal end of said handle, and said distal portion of said cushioning gripping member being tapered towards said distal end of said handle.

5. The tool of claim 4, wherein said central portion said cushioning gripping member has a plurality of gripping nibs.

6. The tool of claim 5, wherein said gripping nibs of said central portion are generally rectangular, and wherein said gripping nibs of said central portion are arranged in a grid on said central portion of said cushioning gripping member.

7. The tool of claim 3, wherein said cushioning gripping member comprises rubber.

8. The tool of claim 1, wherein said terminal end of said arm member is extended substantially perpendicular from said longitudinal axis of said handle.

9. A system comprising:

an electrical box with a knockout ring;

an elongate handle having an outer surface, opposite proximal and distal ends, and a longitudinal axis being extended between said proximal and distal ends of said handle, said handle having a generally circular cross-section substantially perpendicular to said longitudinal axis of said handle;

said handle having a tapering diameter from a point spaced from and adjacent to said proximal end to said distal end;

an elongate cushioning gripping member being provided on said outer surface of said handle, said cushioning gripping member having a generally circular cross-section substantially perpendicular to said longitudinal axis of said handle, said cushioning gripping member having proximal, central, and distal portions, said central portion of said cushioning gripping member being interposed between said proximal and distal portions of said cushioning gripping member, said proximal portion of said cushioning gripping member being tapered towards said proximal end of said handle, said distal portion of said cushioning gripping member being tapered towards said distal end of said handle, said distal end of said cushioning gripping member being rounded at said distal end of said handle, said central portion said cushioning gripping member having a plurality of gripping nibs, said gripping nibs of said central portion being generally rectangular, said gripping nibs of said central portion being arranged in a grid on said central portion of said cushioning gripping member;

wherein said cushioning gripping member comprises rubber; and an arcuate arm member being coupled to said proximal end of said handle, said arm member having a pair of lateral sides, and a terminal end, said terminal end having a notch therein for accepting the knockout ring therein, said notch being extended between said lateral sides of said arm member, said terminal end of said arm member being extended substantially perpendicular from said longitudinal axis of said handles;

said notch being defined by an inside face which resides in a plane in parallel with the longitudinal axis and a substantially planar rectangular ton and bottom face which diverge from the inside face, wherein a bisecting plane between the top and bottom face remains in perpendicular relationship with the longitudinal axis;

wherein said notch has a width, said width being at least about 3/16 of an inch;

wherein said handle and said arm member comprise hardened steel;

wherein said tool has a length, said length being about 6 and ½ inches.

* * * * *